United States Patent
Argue et al.

(10) Patent No.: US 8,788,347 B2
(45) Date of Patent: Jul. 22, 2014

(54) REMINDER CALENDARING BASED ON RECEIPT DATA

(71) Applicants: Stuart Argue, Palo Alto, CA (US); Anthony Emile Marcar, San Francisco, CA (US)

(72) Inventors: Stuart Argue, Palo Alto, CA (US); Anthony Emile Marcar, San Francisco, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 0 days.

(21) Appl. No.: 13/688,111

(22) Filed: Nov. 28, 2012

(65) Prior Publication Data

US 2014/0149236 A1    May 29, 2014

(51) Int. Cl.
  *G06Q 20/00*    (2012.01)
  *G06G 1/14*    (2006.01)

(52) U.S. Cl.
  USPC ............................................. 705/16; 705/22

(58) Field of Classification Search
  USPC .......................................................... 705/16
  See application file for complete search history.

(56) References Cited

U.S. PATENT DOCUMENTS 8,271,336 B2 *  9/2012  Mikurak ......................... 705/22
8,433,605 B2 *  4/2013  Hufford et al. ................... 705/3

* cited by examiner

*Primary Examiner* — Garcia Ade
(74) *Attorney, Agent, or Firm* — David R. Stevens; Stevens Law Group

(57) ABSTRACT

A computer-implemented method is disclosed for calendaring reminders. Within the method, one or more point-of-sale transactions may be conducted. The transactions may involve a computer system and a customer possessing a mobile computing device. The computer system may store receipt data documenting the transactions. The computer system may also search the receipt data in an effort to locate one or more products having predictable purchase periodicity. When such products are identified, one or more appropriate reminders for subsequent purchases of the one or more products may be scheduled.

20 Claims, 9 Drawing Sheets

REMINDER CALENDARING BASED ON RECEIPT DATA

BACKGROUND

1. Field of the Invention

This invention relates to point-of-sale systems and more particularly to systems and methods for analyzing electronic receipt data and suggesting and scheduling reminders based thereon.

2. Background of the Invention

Many point-of-sale (POS) systems currently in use today do not support important emerging technologies, services, and marketing opportunities. For example, many POS systems are limited in their ability to collect and analyze electronic receipt data. As a result, those POS systems cannot effectively implement many novel methods and services surrounding such data. Accordingly, what is needed is an apparatus and method expanding the ability of a wide variety of POS systems and supporting computer systems, include legacy POS systems, to use electronic receipt data to benefit customers.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
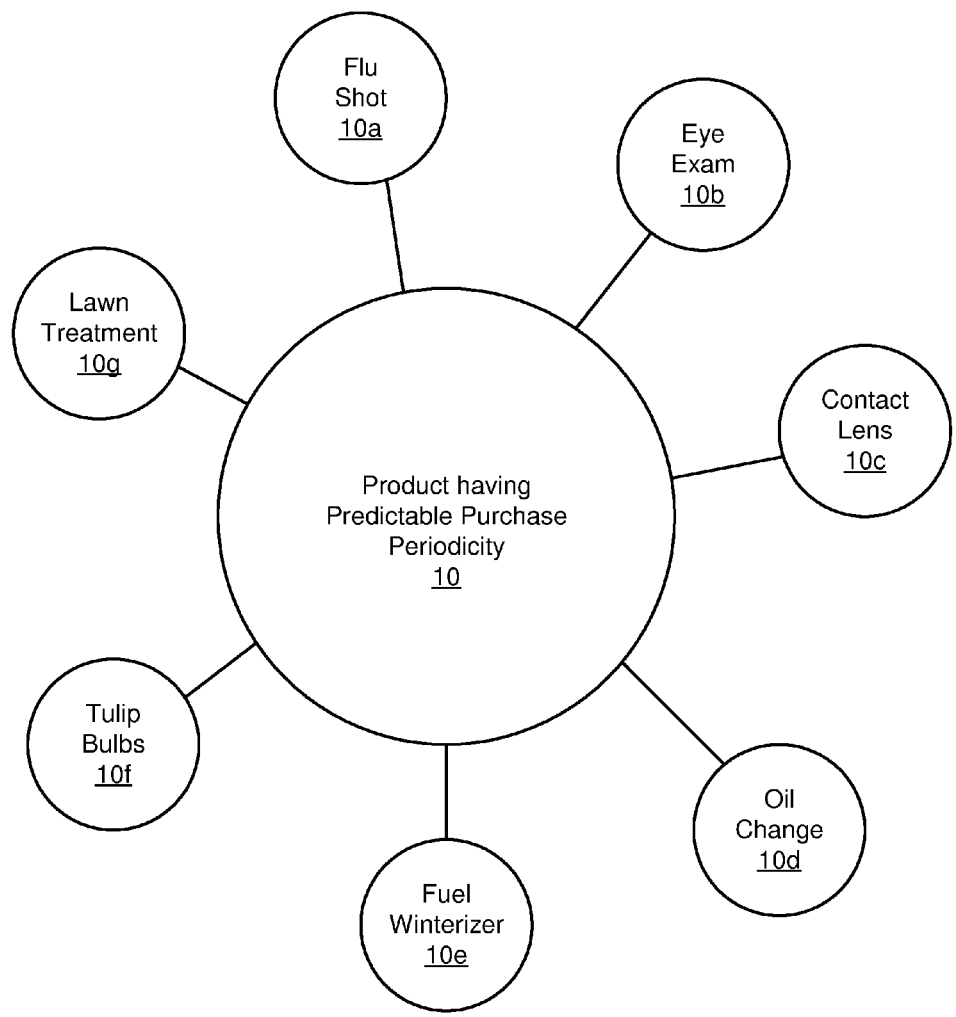
FIG. 1 is a schematic diagram illustrating an array of products that may have a predictable purchase periodicity in accordance with the present invention.

Referring to FIG. 1, in selected embodiments, a business, retailer, or the like may market one or more goods or services. Certain such goods or services may be products 10 having predictable purchase periodicity. That is, certain products 10 may have inherent characteristics or uses which make them likely to be purchased at predictable times of the year, intervals, or the like. In selected embodiments, such predictably may correspond to the periodicity of a calendar year (e.g., the periodicity of the seasons). In other embodiments, the predictability may correspond to known or expected rates of consumption. In still other embodiments, the predictability may correspond to something else (e.g., business standards, accepted best practices, laws, government regulations, or the like).

Products 10 having predictable purchase periodicity may be goods and/or services. Such products 10 may arise in a variety of areas of commercial operation including healthcare, car and motor care, yard and garden care, as well as others. For example, a sampling of products 10 having predictable purchase periodicity may include certain vaccines (e.g., flu shots 10a administered yearly in the fall), eye exams 10b conducted periodically (e.g., every two years) in conjunction with the renewal of a prescription, contact lens 10c (e.g., daily wear contacts that need to be repurchased as soon as the number of days since the last purchase equals the number of pairs purchased), oil changes 10d (e.g., every three to six months on average), fuel winterizer 10e (e.g., additives added each fall to fuels tanks or cans that will not be used through the winter), tulip bulbs 10f to be planted in the fall, lawn treatments 10g (e.g., yearly treatments, winterizers, etc.), and the like.

Figure 2:
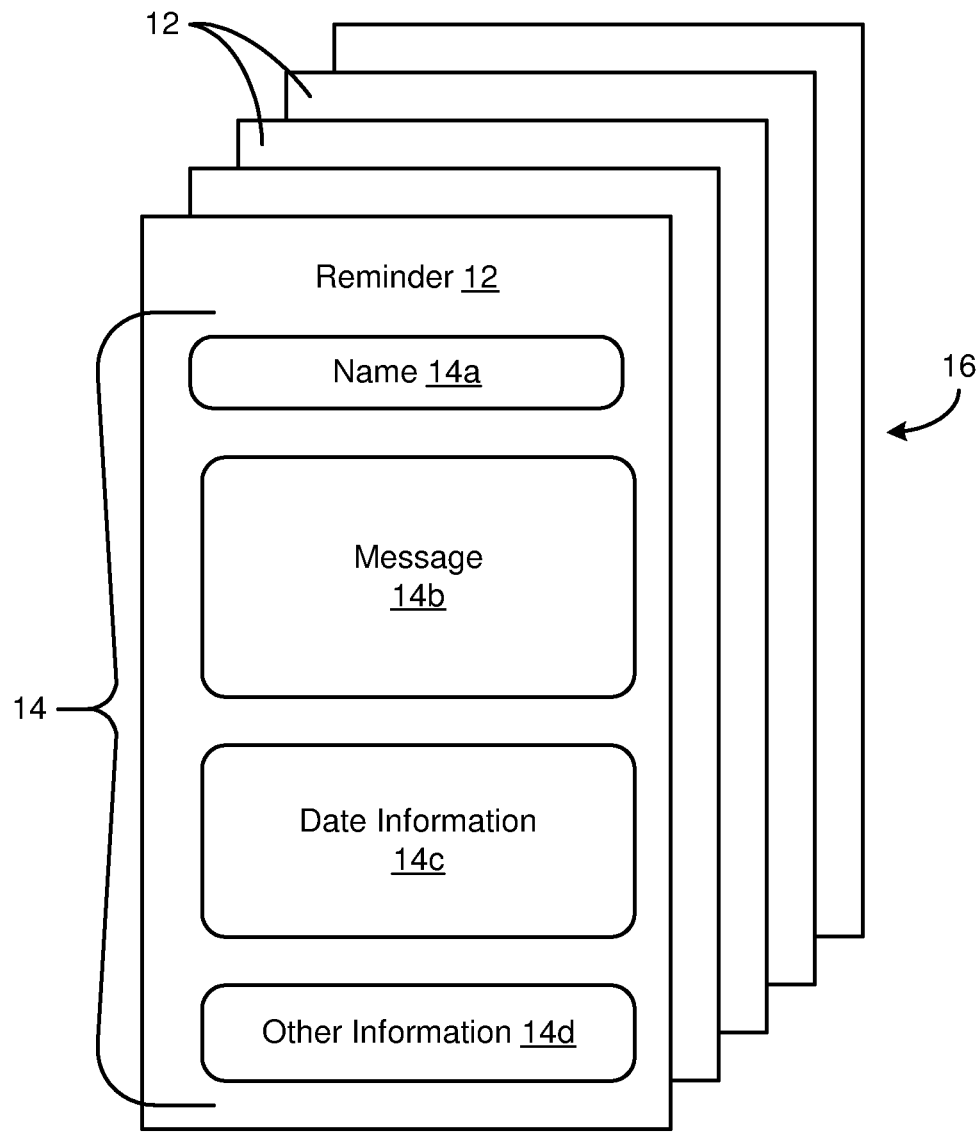
FIG. 2 is a schematic diagram illustrating one embodiment of a reminder in accordance with the present invention.

Referring to FIG. 2, in selected embodiments, one or more computers, computers systems, mobile computing devices, or the like or a combination or sub-combination thereof may support, enable, or administer a reminder-suggestion and/or reminder-scheduling apparatus and method. A reminder 12 may be a computer record containing data 14 that, when acted upon or implemented by an appropriate computer system, application, or the like, brings some matter to the attention of one or more users of the computer system, application, or the like.

Selected embodiments in accordance with the present invention may generate, utilize, or schedule one or more reminders 12 or collections 16 of reminders 12. The one or more reminders 12 may comprise any suitable arrangement of data 14. For example, in certain embodiments, each reminder 12 may include a name 14a or unique identifier 14a, one or more messages 14b (e.g., text communicating one or more messages, an identification referring to text communicating one or more messages, or the like), selected date or timing information 14c indicating when the corresponding message 14b is to be issued or brought to the attention of the appropriate person, other information 14d as desired or necessary, or the like or a combination of sub-combination thereof.

In certain embodiments, one or more reminders 12 may correspond to one or more products 10 having predictable purchase periodicity. For example, a reminder 12 may assist in reminding a customer to repurchase a particular product 10. Accordingly, if a customer purchased ninety pairs of daily wear contacts on January 1, a reminder 12 may be generated, stored, and issued to remind the customer shortly before March 31 that it may be time to purchase more contacts. In such an embodiment, the message 14b may include "It may be time to purchase more contacts" or the like. The date information 14c may include something like "March 24 at 10:00 AM" or some other suitable date and time.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer of a point-of-sale (POS) system, partly on a POS computer, as a stand-alone software package, on a stand-alone hardware unit, partly on a remote computer spaced some distance from the POS computer, or entirely on a remote computer or server. In the latter scenario, the remote computer may be connected to the POS computer through any type of network, including a local area network (LAN) or a wide area network (WAN), or the connection may be made to an external computer (e.g., through the Internet using an Internet Service Provider).

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 3:
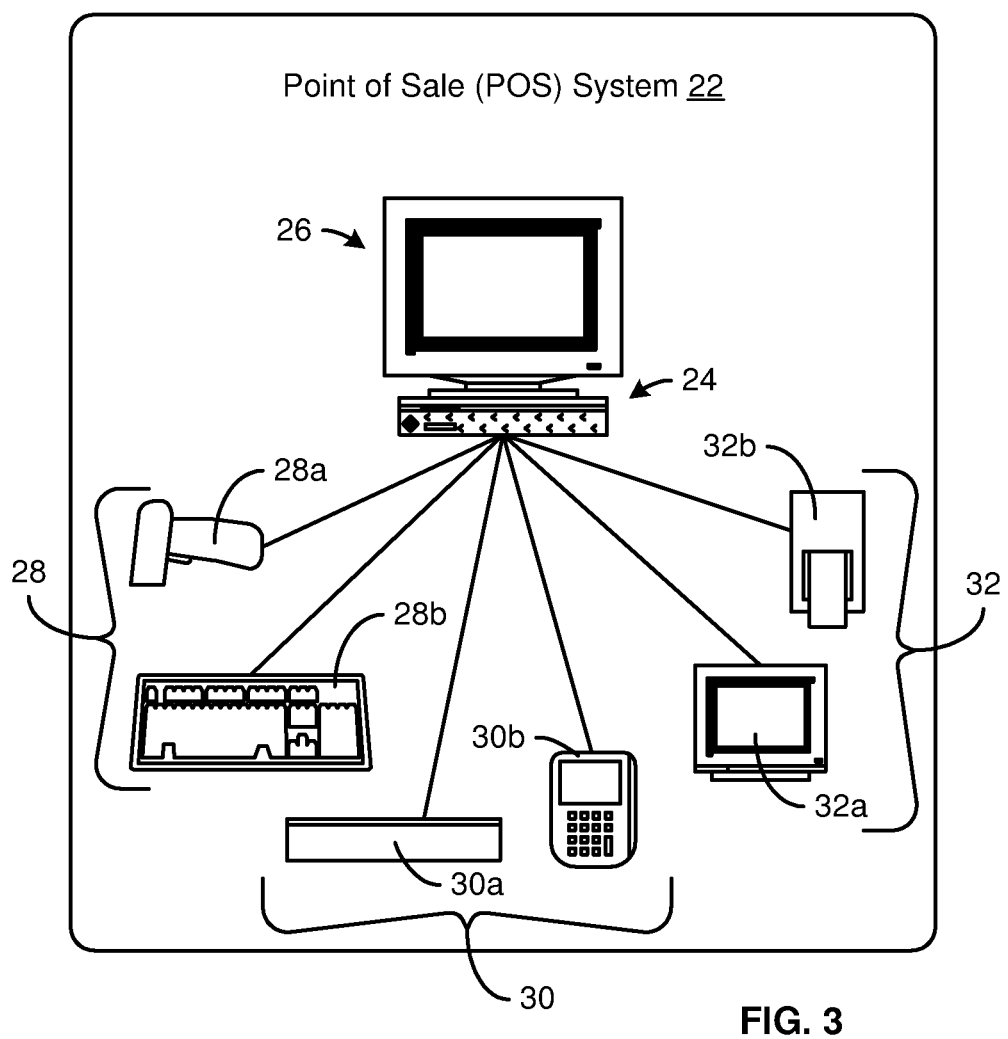
FIG. 3 is a schematic block diagram of one embodiment of a point-of-sale (POS) system for implement methods in accordance with the present invention.

Referring to FIG. 3, in selected embodiments, the hardware, software, or hardware and software of a POS system 22 may be configured to implement one or more methods in accordance with the present invention. A POS system 22 in accordance with the present invention may include various components. In certain embodiments, a POS system 22 may include a central or primary computer 24, a monitor 26 (e.g., a cashier-facing monitor 26), one or more input devices 28 (e.g., scanners 28a, keyboards 28b, scales, or the like), one or more payment devices 30 (e.g., cash drawers 30a, card readers 30b) for receiving or returning payments, one or more output devices 32 (e.g., customer-facing display 32a or monitor 32a, receipt printer 32b), or the like or combinations or sub-combinations thereof.

A computer 24 may form the primary processing unit of a POS system 22. Other components 28, 30, 32 forming part of a POS system 22 may communicate with the computer 24. Input devices 28 and certain payment devices 30 may feed data and commands to a computer 24 for processing or implementation. For example, a scanner 28a may pass data communicating the identity of one or more items to be purchased, returned, or the like to a computer 24. Similarly, a card reader 30b may pass payment information to a computer 24.

Conversely, output devices 32 and certain payment devices 30 may follow or implement commands issued by a computer 24. For example, a cash drawer 30a may open in accordance with the commands of a computer 24. Similarly, a customer-facing display 32a and receipt printer 32b may display or output data or information as instructed by a computer 24.

In selected embodiments, in addition to handling consumer transactions (e.g., purchases, returns), a POS system 22 may also provide or support certain "back office" functionality. For example, a POS system 22 may provide or support inventory control, purchasing, receiving and transferring products, or the like. A POS system 22 may also store sales and customer information for reporting purposes, marketing purposes, receivables management, trend analysis, cost analysis, price analysis, profit analysis, or the like. If desired or necessary, a POS system 22 in accordance with the present invention may include an accounting interface to pass certain information to one or more in-house or independent accounting applications.

Figure 4:
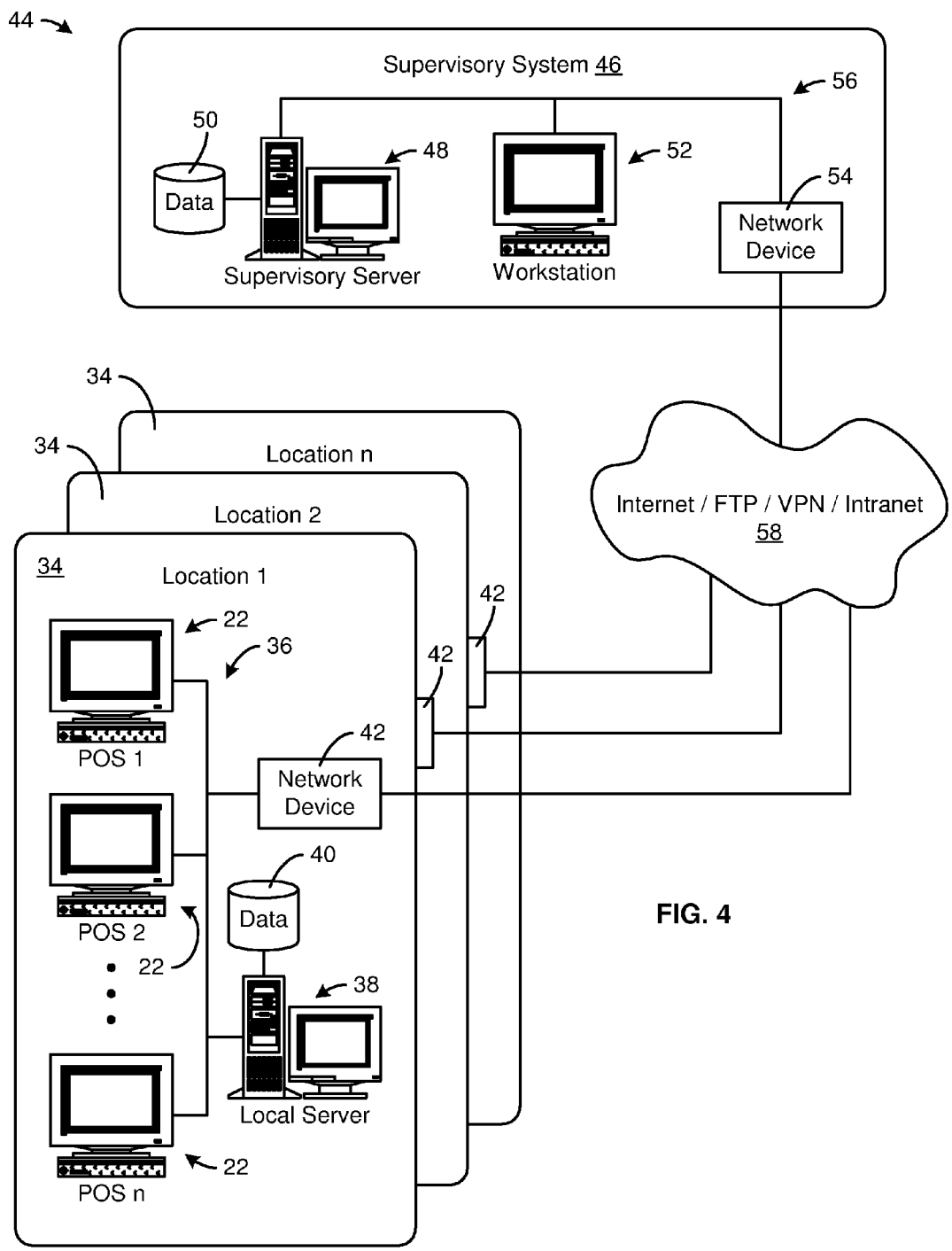
FIG. 4 is a schematic block diagram of one embodiment of multiple POS systems in accordance with the present invention operating in the context of an enterprise-wide system.

Referring to FIG. 4, in selected embodiments, a POS system 22 may operate substantially independently, as a stand-alone unit. Alternately, a POS system 22 in accordance with the present invention may be one of several POS systems 22 forming the front line of a larger system. For example, multiple POS systems 22 may operate at a particular location 34 (e.g., within a retail, brick-and-mortar store). In such embodiments, the various POS systems 22 may be interconnected via a LAN 36. A LAN 36 may also connect the POS systems 22 to a local server 38.

A local server 38 may support the operation of the associated POS systems 22. For example, a server 38 may provide a central repository from which certain data needed by the associated POS systems 22 may be stored, indexed, accessed, or the like. A server 38 may serve certain software to one or more POS systems 22. In certain embodiments, a POS system 22 may offload certain tasks, computations, verifications, or the like to a server 38.

Alternatively, or in addition thereto, a server 38 may support certain back office functionality. For example, a server 38 may receive and compile (e.g., within one or more associated databases 40) data from the various associated POS systems 22 to provide or support inventory control, purchasing, receiving and transferring products, or the like. A server 38 may also receive and compile sales and customer information for reporting purposes, marketing purposes, receivables management, trend analysis, cost analysis, price analysis, profit analysis, or the like.

In certain embodiments, one or more POS systems 22 or servers 38 corresponding to a particular location 34 may communicate with or access one or more remote computers or resources via one or more network devices 42. For example, a network device 42 may enable a POS system 22 to contact outside resources and verify the payment credentials (e.g., credit card information) provided by a customer. A network device 42 may comprise a modem, router, or the like.

In selected embodiments, a POS system 22 in accordance with the present invention may operate within an enterprise-wide system 44 comprising multiple locations 34 (e.g., branches 34 or stores 34). In such embodiments, each location 34 may have one or more POS systems 22, local servers 38, local databases 40, network devices 42, or the like or combinations or sub-combinations thereof connected by a computer network (e.g., a LAN 36). Additionally, each such location 34 may be configured to interact with one or more supervisory systems 46. For example, multiple branch locations 34 may report to an associated "headquarters" location or system.

A supervisory system 46 may comprise one or more supervisory servers 48, databases 50, workstations 52, network devices 54, or the like or combinations or sub-combinations thereof. The various components of a supervisory system 46 may be interconnected via a computer network (e.g., a LAN 56). In selected embodiments, a supervisory system 46 may comprise one or more supervisory servers 48 providing a central repository from which certain data needed by the one or more POS systems 22 or local servers 38 may be stored, indexed, accessed, or the like.

Alternatively, or in addition thereto, a supervisory server 48 may receive and compile (e.g., within one or more associated databases 50) data from the various associated POS systems 22 or local servers 38 to provide or support inventory control, purchasing, receiving and transferring products, or the like. A supervisory server 48 may also receive and compile sales and customer information for reporting purposes, marketing purposes, receivables management, trend analysis, cost analysis, price analysis, profit analysis, or the like.

A supervisory system 46 may be connected to one or more associated locations 34 or branches 34 in via any suitable computer network 58 (e.g., WAN 58). For example, in selected embodiments, one or more locations 34 may connect to a supervisor system 46 via the Internet. Communication over such a network 58 may follow any suitable protocol or security scheme. For example, communication may utilize the File Transfer Protocol (FTP), a virtual private network (VPN), intranet, or the like.

Figure 5:
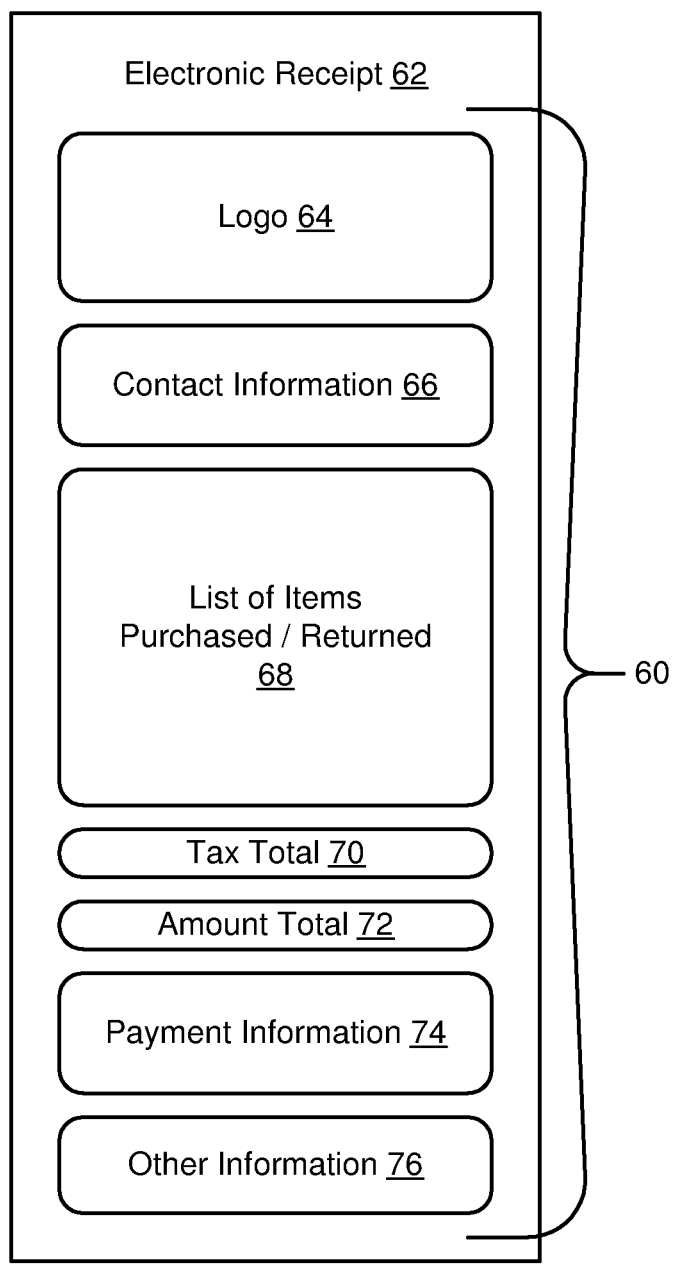
FIG. 5 is a schematic block diagram of one embodiment of a receipt in accordance with the present invention.

Referring to FIG. 5, a POS system 22 may collect and/or generate receipt data 60. Receipt data 60 may document a transaction (e.g., sale or return) carried out by a POS system 22. Receipt data 60 may be presented or displayed to a customer in the form of an electronic (e.g., paperless) receipt 62. In selected embodiments, receipt data 60 may be delivered to a customer's computing device (e.g., a mobile telephone, personal digital assistant (PDA), media player, tablet computer or reader, laptop computer, desktop computer, or the like, hereinafter a "computing device") by an entity's computer system (e.g., a system comprising one or more POS systems 22, local servers 38, supervisory servers 48, some other onsite resources, one or more applications running on a customer's computing device, some other offsite resources, or the like or combinations or sub-combinations thereof, hereinafter a "computer system").

In selected embodiments, receipt data 60 and an electronic receipt 62 may include a logo 64, contact information 66, a list 68 of items purchased or returned, a total 70 indicating the sales tax assessed or returned, a total 72 indicating the amount paid or returned, payment information 74, other information 76, or the like or combinations or sub-combinations thereof.

A logo 64 may reinforce the brand and image of the associated entity within the mind of a consumer. By including contact information 66 on an electronic receipt 62, an entity may ensure that a customer has ready access to one or more physical addresses, Internet address, telephone numbers, facsimile numbers, hours of operation, or the like or combinations or sub-combinations thereof. One or more of a list 68 of items purchased or returned, a total 70 indicating the sales tax assessed or returned, a total 72 indicating the amount paid or returned, and payment information 74 (e.g., date of transaction, an indication of method of payment, an indication of which credit or debit card was used, etc.) may be included to document important details of a transaction.

Other information 76 may be included within an electronic receipt 62 as desired or necessary. For example, to promote brand loyalty, an entity may include an indication of an amount saved in the transaction, a yearly total of the amount saved, reward points earned, or the like. Alternatively, or in addition thereto, other information 60 may include promotional information, a solicitation to participate in a survey, an employment opportunity, contest information, or the like.

An electronic receipt 62 may be presented by a computing device of a customer in any suitable layout or format. For example, the receipt data 60 forming an electronic receipt 62 may simply be presented as a textual list. Alternatively, an electronic receipt 62 may follow the form of a paper receipt. That is, the electronic receipt 62 may comprise a virtual representation or layout substantially matching what a comparable paper receipt would look like.

The manner in which an electronic receipt 62 is presented or displayed on a computing device of a customer may be completely dictated by the computer system delivering the receipt data 60 thereto. Alternatively, the computing device of the customer may have an application (e.g., a receipt manager, accounting program, budgeting program, or the like) installed thereon. Such an application may partially or completely control the layout or format of an electronic receipt 62 displayed therewith or therethrough. For example, a computer system may supply receipt data 60, while the application installed on the computing device of the customer supplies the layout or formatting.

Figure 6:
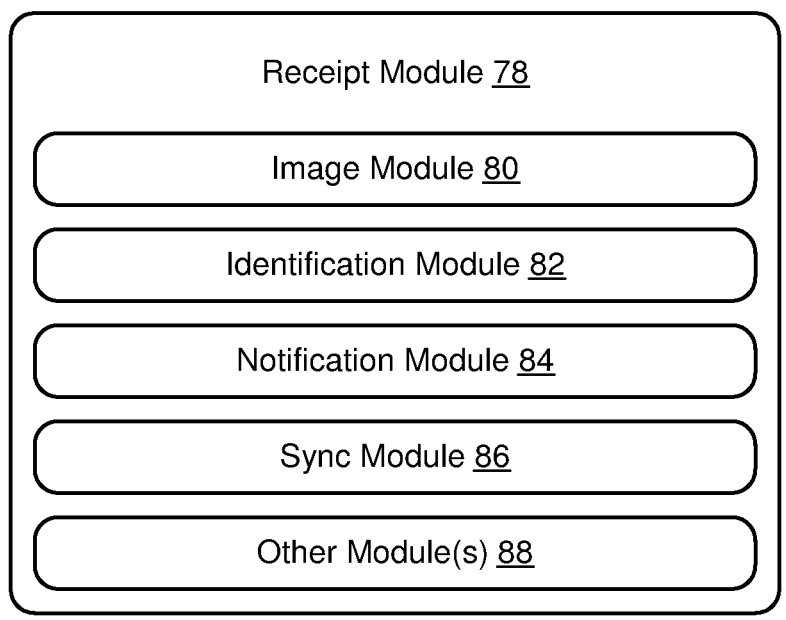
FIG. 6 is a schematic block diagram of one embodiment of a receipt module in accordance with the present invention.

Referring to FIG. 6, a computer system in accordance with the present invention may deliver receipt data 60 to a computing device of a customer in any suitable manner. In selected embodiments, a receipt module 78 may enable or support such delivery. A receipt module 78 may include any suitable arrangement of sub-components or modules. In certain embodiments, a receipt module 78 may include an image module 80, identification module 82, notification module 84, synchronization module 86, one or more other modules 88 as desired or necessary, or the like or some combination or sub-combination thereof.

An image module 80 may assemble, generate, or obtain an advertisement comprising a call to action. A call to action may invite or motivate a customer to take a particular step or action. For example, a call to action may invite or motive a consumer to download receipt data 60. To increase the likelihood that a consumer will respond favorably to the call to action, an advertisement may include an enabler facilitating the desired step or action. For example, in selected embodiments, an advertisement may include a machine-readable code. By scanning the code (e.g., scanning the code using a camera on a mobile telephone, tablet computer, or the like), a consumer may import receipt data 60 encoded within the code. Alternatively, scanning the code may initiate the download of receipt data 60.

For example, a machine-readable code may be encoded with a URL. In addition to designating a particular resource, a URL may also include a transaction identification (ID). Accordingly, after an appropriate application is launched and a machine-readable code is scanned, a URL may be passed from a customer (e.g., from a mobile telephone of a customer) to an Internet Service Provider (e.g., a telecommunications provider). As a result, an appropriate resource within a computer system may be accessed and receipt data may be returned to (e.g., downloaded by) a computing device.

In selected embodiments, a machine-readable code may comprise a barcode. For example, in certain embodiments, a machine-readable code may comprise a two-dimensional barcode. Two-dimensional barcodes may support or provide more data per unit area than can be obtained using a traditional one-dimensional barcode. Moreover, two-dimensional barcodes are typically configured to be scanned using a camera, an item that is commonly found on personal electronic devices. A two-dimensional barcode for use in accordance with the present invention may follow any suitable protocol, format, or system. In selected embodiments, a two-dimensional code may be embodied as a Quick Response (QR) Code.

An identification module 82 may be tasked with requesting, collecting, and/or communicating identification information linking a customer associated with a transaction with one or more records stored within a computer system. For example, as part of a transaction carried out at a POS system 22, an identification module 82 may request, collect, and/or communicate identification information linking a transaction to a particular computing device corresponding to the customer participating in the transaction. Thus, information corresponding to the transaction may be passed to the customer via the particular computing device.

An identification module 82 may request, collect, and/or communicate one or more types of identification information. For example, in selected embodiments, an identification module 82 may collect a unique identification or membership number from a customer. This may be done when a membership card, club card, loyalty card, identification card, credit card, debit card, fingerprint or other biometric characteristic, or the like is scanned, input, or otherwise collected at a POS system 22. In other situations, a cashier or customer may type in a unique identification number, payment number, membership number, or the like at a POS system 22. For example, while a cashier is processing a transaction, a customer may be prompted via a card reader 30b, customer-facing display 32a, or the like to enter (e.g., type in using the card reader 30b) a mobile telephone number corresponding to the customer. Alternatively, a cashier may type in a telephone number corresponding to the customer.

Once the identification information is received, it may be used directly (e.g., used directly to pass receipt data 60 to a computing device of a corresponding customer). Alternatively, or in addition thereto, the identification information may tie or link a current transaction to one or more previously stored computer records. For example, within such records, a computer system may find the information necessary to identify and communicate with a computing device or account of a corresponding customer. Alternatively, or in addition thereto, such records may enable a computer system to tie or link a current transaction to an appropriate computing device or account.

A notification module 84 may assemble, generate, obtain, direct, and/or issue one or more push notifications. In selected embodiments, push notifications may be directed to a computing device of a customer. For example, when an appropriate application in not running on a computing device, push notifications may inform the customer that certain data or options are available (e.g., that a new electronic receipt 62 is available for download).

A synchronization module 86 may support or enable one way or two way data communication between a computer system and a computing device. For example, a synchronization module 86 may support or enable the passing of receipt data 60 from a computer system to a computing device. A synchronization module 86 may also enable certain data received from a computing device to be incorporated within or used by a computer system. For example, one or more user preferences (e.g., notification preferences) may be communicated to a computer system from an application resident on a computing device.

The various functions or modules of a receipt module 78 may be enacted or implemented by any suitable system or component thereof. For example, in selected embodiments, one or more functions or modules of a receipt module 78 may be distributed across one or more hardware devices, including a primary computer 24 of a POS system 22, a local server 38, a supervisory server 48, some other onsite resource, a computing device, some other offsite resource, or the like or combinations or sub-combinations thereof. Thus, systems and methods in accordance with the present invention may be adapted to a wide variety of situations, including more rigid legacy systems.

Figure 7:
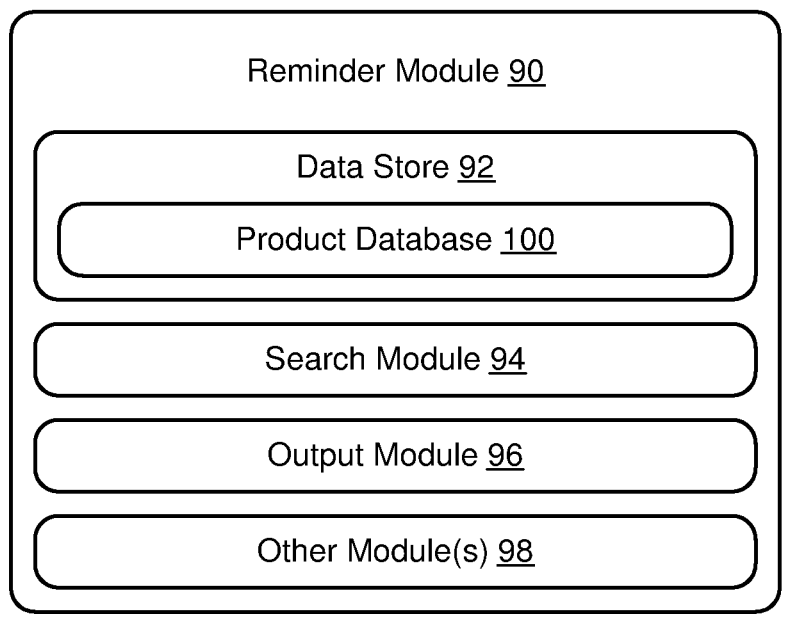
FIG. 7 is a schematic block diagram of one embodiment of a reminder module in accordance with the present invention.

Referring to FIG. 7, in selected embodiments, one or more computers, computers systems, mobile computing devices, or the like or a combination or sub-combination thereof may support or enable a reminder module 90. A reminder module 90 may enable certain receipt data 60 to be used when suggesting and/or scheduling one or more reminders 12 for one or more corresponding customers. A reminder module 90 may include any suitable arrangement of sub-components or modules. In certain embodiments, a reminder module 90 may include a data store 92, search module 94, output module 96, one or more other modules 98 as desired or necessary, or the like or a combination or sub-combination thereof.

A data store 92 may contain records supporting the operation of a reminder module 90. In selected embodiments, a data store 92 may contain or store one or more reminders 12. Alternatively, or in addition thereto, a data store 92 may contain one or more product databases 100 correlating one or more products 10 having predictable purchase periodicity with the periodicity corresponding thereto. For example, a product database 100 may correlate a pack of ninety pairs of daily wear contacts 10c with a periodicity of ninety days. Similarly, a product database 100 may correlate a fuel winterizer 10e with late fall.

A product database 100 may contain records for any suitable arrangement or combination of products 10. In selected embodiments, a product database 100 may contain records for all products 10 of predictable purchase periodicity sold by a particular retailer. Alternatively, a product database 100 may contain records for only a subset of all products 10 of predictable purchase periodicity sold by a particular retailer. For example, a product database 100 may only contain records for products 10 whose purchase periodicity falls within ranges of time, predictability, or the like (e.g., products 10 whose purchase periodicity is greater than one month and less than or equal to one year).

A search module 94 may be programmed to analyze receipt data 60 corresponding to one or more customers in order to identify therewithin one or more products 10 corresponding to a product database 100. Accordingly, a search module 94 may identify one or more products 10 whose recent purchase is documented within receipt data 60 and whose predictable purchase periodicity is documented within a product database 100.

A search module 94 may employ any suitable method of identification and/or comparison. For example, in selected embodiments, a search module 94 may identify products 10 using or comparing Universal Product Codes (UPCs), retailer-specific identification codes, or the like. That is, a search module 94 may search a product database 100 for the UPCs or the like of items whose purchase is documented within receipt data 60.

An output module 96 may support or enable the generating, passing, storing, implementing, and/or issuing of one or more reminders or queries corresponding thereto. In certain embodiments, when a search module 94 determines that a particular customer has purchased a product 10 having predictable purchase periodicity, an associated output module 96 may query whether the customer would like to create a reminder 12 with respect to that product 10.

For example, an output module 96 may issue a query stating "We noticed you purchased contact lens. Would you like us to remind you to purchase more before you run out?" If the customer responds in the affirmative, an output module 96 may create, communicate, and/or store an appropriate reminder 12. For example, an output module 96 may schedule a push notification, schedule a local notification, generate an reminder 12 in a third party calendar program, or the like or a combination or sub-combination thereof.

The various functions or modules of a reminder module 90 may be enacted or implemented by any suitable system or component thereof. For example, in selected embodiments, one or more functions or modules of a reminder module 90 may be distributed across one or more hardware devices, including a primary computer 24 of a POS system 22, a local server 38, a supervisory server 48, some other onsite resource, a computing device, some other offsite resource, or the like or combinations or sub-combinations thereof. Thus, systems and methods in accordance with the present invention may be adapted to a wide variety of situations, including more rigid legacy systems.

Figure 8:
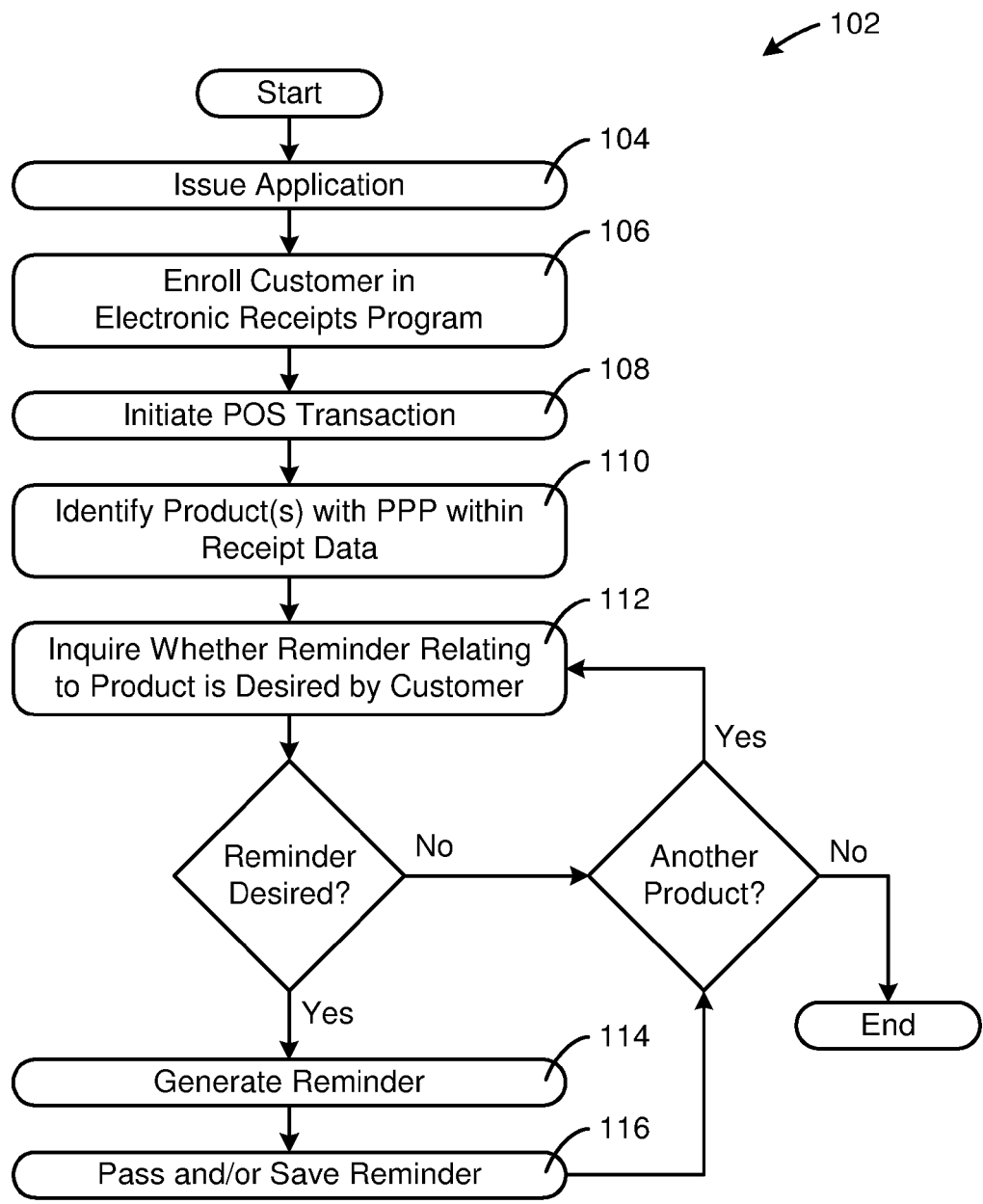
FIG. 8 is a block diagram of one embodiment of a method for suggesting and scheduling one or more reminders in accordance with the present invention.

Referring to FIG. 8, one method 102 in accordance with the present invention may begin when an appropriate application (e.g., a retailer's mobile application, an electronic receipts application, or the like or a combination or sub-combination thereof) is issued 104 and installed on a computing device of a customer. A computer system may then enroll 106 the customer in an electronic receipts program. In selected embodiments, this enrollment 106 may result in the computing device (or an application installed thereon) being linked to or associated with certain identification information within the records of a computer system.

In other embodiments, the enrollment 106 may be independent of any specific computing device. For example, in selected embodiments, enrollment 106 may comprise the generation of an account. The customer may then access the account (e.g., "log into" the account) using a computing device. Accordingly, a customer may access the account via any one of several computing devices. Moreover, by "logging out" of an account, the corresponding computing device may be separated from the account.

So prepared, a customer may then enter a "brick-and-mortar" business location (e.g., enter a brick-and-mortar retail store with his or her computing device), select one or more items for purchase, and approach a POS system 22. At the POS system 22, a transaction (e.g., a purchase of one or more items) may be initiated 108.

During the transaction, a computer system may receive identification information. For example, a POS system 22 may scan a membership card, club card, loyalty card, identification card, credit card, debit card, or the like. From the scan, identification information (e.g., a unique identification number, membership number, or the like) may be obtained. Alternatively, while a cashier is processing a transaction, a customer may be prompted via a card reader 32b, customer-facing display 32a, or the like to enter (e.g., type in using the card reader 32b) an identification number (e.g., a mobile telephone number).

Identification information may be passed from a POS system 22 to one or more other computers (e.g., servers 38, 48) within a computer system. The identification information may link a customer and a corresponding transaction to one or more records stored within a computer system. In selected embodiments, such records may contain the information necessary to identify and communicate with a computing device or account of the corresponding customer. Accordingly, a computer system may deliver receipt data 60 documenting the transaction to an appropriate computing device or account.

At some point (e.g., during a transaction or shortly thereafter), a computer system may identify 110 with corresponding receipt data 60 one or more products 10 having predictable purchase periodicity. This may include identifying 110 one or more products 10 whose recent purchase is documented within receipt data 60 and whose predictable purchase periodicity is documented within a product database 100. For one or more such products 10, a computer system may then inquire 112 whether reminders 12 corresponding to the products 10 is desired by the customer.

If an inquiry 112 reveals no reminder 12 is desired, and no more inquiries 112 for other products 10 are needed or are to be made, then a method 102 may end. Conversely, if an inquiry 112 reveals no reminder 12 is desired, and another inquiry 112 corresponding to another product 10 is needed or desired, then a method 102 may continue with an inquire 112 whether a reminder 12 corresponding to the next product 10 is desired by the customer.

Whenever a reminder 12 for a particular product 10 is desired (e.g., whenever the response to an inquiry 112 is in the affirmative), then a method 102 may continue with the generation 114 of an appropriate reminder 12 and the passing 116 and/or saving 116 of the reminder 12. A reminder 12 may be passed 116 or saved 116 in any suitable manner. For example, in selected embodiments, a reminder 12 may be passed 116 to or saved 116 by a server 38, 48 or the like. Accordingly, the reminder 12 may be issued as notification (e.g., a push notification) sent to a computing device, or posted to an account, of an appropriate customer.

Alternatively, a reminder 12 may be passed 116 to or saved 116 by a computing device or an application installed thereon. For example, in selected embodiments, a reminder 12 may be saved 116 as a local notification within an application (e.g., a retailer's mobile application, an electronic receipts application, or the like or a combination or sub-combination thereof) installed on the computing device of an appropriate customer. Alternatively, a reminder 12 may be saved 116 as an event or task within a software-based calendar installed on computing device (e.g., a native calendar program, a calendar application corresponding to an entity independent of the retailer at issue, or the like).

Figure 9:
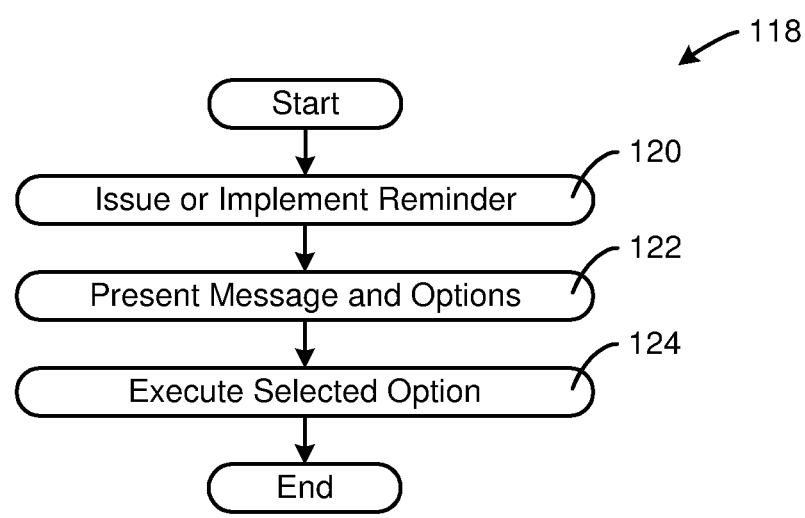
FIG. 9 is a block diagram of one embodiment of a method for issuing or resolving one or more reminders in accordance with the present invention.

Referring to FIG. 9, a system in accordance with the present invention may terminate or cancel a reminder 12 before it is issued or implemented. For example, in selected embodiments, a reminder module 90 may cancel, delete, or otherwise deactivate a reminder 12 when a product 10 forming the basis thereof is purchased. This may be done automatically. Alternatively, a reminder module 90 may query a customer as to whether a particular reminder 12 should be terminated. For example, a reminder module 90 may query "It looks like you have purchased Product A. Would you like us to cancel the reminder corresponding to that product?"

If a reminder 12 is not prematurely terminated or canceled, it may be issued or implemented. Accordingly, one method 118 in accordance with the present invention may begin when a date and/or time corresponding to a reminder 12 has been reached. The reminder 12 may then be issued 120 or implemented 120. A reminder 12 may be issued 120 by some device (e.g., a server 38, 48 or the like) within a computer system.

For example, a reminder 12 in the form of a notification may be sent by a computer system to an account or an application running on a computing device. Alternatively, a reminder 12 in the form of a push notification directed to an appropriate computing device may be initiated by a computer system. In still other embodiments, a reminder 12 may issue 120 from an application installed on an appropriate computing device. Such an application may be a retailer's mobile application, an electronic receipts application, a native calendar program, a calendar application corresponding to an entity independent of the retailer at issue, or the like.

In selected embodiments, implementation 120 of a reminder 12 may result in one or more messages 14b and/or options being presented 122 to an appropriate customer via a computing device possessed by the customer. Any suitable messages 14b and/or options may be presented 120. In certain embodiments, a message 14b may remind a customer to purchase a particular product. For example, a message 14b may state "It looks like you will run out of contacts next week."

One or more options presented 122 as part of a reminder 12 may enable a customer to react to the reminder 12 in any appropriate manner. Suitable options presented 122 may include an option to dismiss the reminder 12, an option to reschedule the reminder 12 (e.g., a "snooze" option to "Remind me again next week," "Remind me again next month," implement a geo-fence to "Remind me next time I'm in the store," or the like), an option to add a product to a shopping list (e.g., "Add contacts to my shopping list"), or the like or a combination or sub-combination thereof.

Once a particular option is selected, it may be implemented 124 or executed 124. For example, if a "dismiss" option is selected, a corresponding reminder 12 may be deleted. Alternatively, is a "reschedule" or "add to shopping list" option is selected, appropriate action may be taken to reschedule the reminder 12, add the product to a current shopping list, or the like.

The flowchart in FIGS. 8 and 9 illustrate the architecture, functionality, and operation of possible implementations of systems, methods, and computer program products according to certain embodiments of the present invention. In this regard, each block in the flowcharts may represent a module, segment, or portion of code, which comprises one or more executable instructions for implementing the specified logical function(s). It will also be noted that each block of the flowchart illustrations, and combinations of blocks in the flowchart illustrations, may be implemented by special purpose hardware-based systems that perform the specified functions or acts, or combinations of special purpose hardware and computer instructions.

It should also be noted that, in some alternative implementations, the functions noted in the blocks may occur out of the order noted in the Figures. In certain embodiments, two blocks shown in succession may, in fact, be executed substantially concurrently, or the blocks may sometimes be executed in the reverse order, depending upon the functionality involved. Alternatively, certain steps or functions may be omitted if not needed.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A computer-implemented method for calendaring a reminder, the method comprising:

storing, by a computer system, one or more records identifying one or more products;

storing, by the computer system, within the one or more records, a time period for each product of the one or more products, the time period identifying for a corresponding product of the one or more products an expected length of time between purchases of the corresponding product by a customer;

conducting, by a point-of-sale system forming part of the computer system, a point-of-sale transaction comprising a sale of one or more goods or services to the customer, the sale occurring on a first date;

searching, by the computer system, data documenting the sale to determine whether any product of the one or more products was purchased as part of the sale;

determining, by the computer system based on the searching, that a first good or service purchased in the sale is a first product of the one or more products; and scheduling, by the computer system, a reminder for the customer to make another purchase of the first product on a second date, the temporal spacing between the second date and the first date being equal to the time period stored in the one or more records for the first product.

2. The method of claim 1, wherein the point-of-sale system is contained within a brick-and-mortar store corresponding to a retailer.

3. The method of claim 2, wherein the conducting comprises receiving the customer within the brick-and-mortar store.

4. The method of claim 3, wherein the customer possesses a computing device and the conducting further comprises delivering receipt data to a first application installed on the computing device in the form of an electronic receipt.

5. The method of claim 4, wherein the scheduling comprises scheduling the reminder as a push notification to be sent to the computing device on the second date.

6. The method of claim 5, further comprising sending, by the computer system, the push notification on the second date.

7. The method of claim 4, wherein the scheduling comprises scheduling the reminder within the first application as a local notification to be issued on the second date.

8. The method of claim 7, further comprising issuing, by the first application, the reminder on the second date.

9. The method of claim 4, wherein the scheduling comprises passing the reminder to a second application installed on the computing device, the second application providing a software-based calendar.

10. The method of claim 9, wherein the second application corresponds to an entity independent of the retailer.

11. The method of claim 10, further comprising issuing, by the second application, the reminder.

12. The method of claim 4, wherein the computing device comprises a mobile telephone.

13. The method of claim 1, wherein each product of the one or more products comprises a good or a service.

14. A computer-implemented method for calendaring a reminder, the method comprising:
   storing, by a computer system, one or more records identifying one or more goods or services;
   storing, by the computer system, within the one or more records, a time period for each of the one or more goods or services, the time period identifying for a corresponding good or service an expected length of time between purchases thereof by a customer;
   conducting, by a point-of-sale system forming part of the computer system, a point-of-sale transaction comprising a sale of one or more products to the customer, the sale occurring on a first date;
   determining, by the computer system, that a first product purchased in the sale is a first good or service of the one or more goods or services;
   scheduling, by the computer system, a reminder for the customer to make another purchase of the first good or service on a second date, the temporal spacing between the second date and the first date being equal to the time period stored in the one or more records for the first good or service; and
   sending, by the computer system on the second date, the reminder to purchase the first good or service to a mobile computing device of the customer.

15. The method of claim 14, wherein the point-of-sale system is contained within a brick-and-mortar store corresponding to a retailer.

16. The method of claim 15, wherein the conducting comprises receiving the customer within the brick-and-mortar store.

17. The method of claim 16, wherein the computer system comprises a first application installed on the mobile computing device.

18. The method of claim 17, wherein the conducting further comprises delivering receipt data documenting the sale to the first application.

19. The method of claim 18, wherein the scheduling comprises scheduling the reminder within the first application as a local notification to be issued on the second date.

20. A computer system comprising:
   one or more processors;
   one or more memory devices operably connected to the one or more processors; and
   the one or more memory devices collectively storing
      a receipt module programmed to deliver receipt data documenting one or more point-of-sale transactions to one or more computing devices of corresponding customers,
      a data store storing one or more records identifying one or more goods or services,
      the data store further storing within the one or more records, a time period for each good or service of the one or more goods or services, the time period identifying for the each good or service an expected length of time between purchases thereof by a customer,
      a search module programmed to search data documenting the one or more point-of-sale transactions to determine whether any good or service of the one or more goods or services was purchased therewithin, and
      an output module programmed to schedule, when a good or service of the one or more goods or services is purchased within a transaction of the one or more transactions, a reminder for a corresponding customer to make another purchase of the good or service after the passage of the time period stored in the one or more records for the good or service.

* * * * *